July 5, 1949.　　　D. L. CAMPBELL　　　2,475,218
VAPOR PRESSURE INDICATOR DEVICE
Filed Dec. 28, 1943
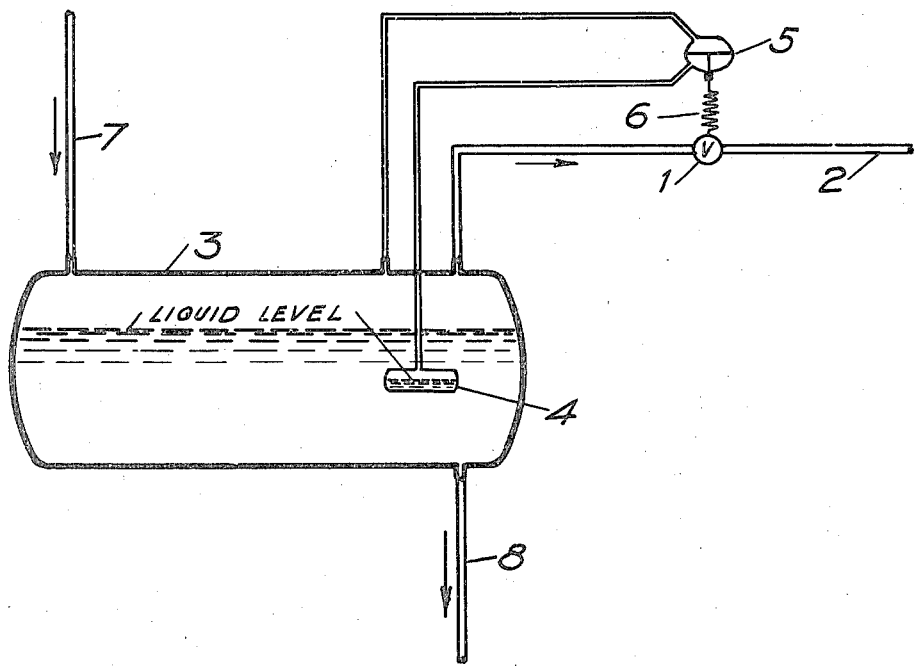
Donald L. Campbell Inventor
By ........... Attorney Patented July 5, 1949

2,475,218

UNITED STATES PATENT OFFICE 2,475,218

VAPOR PRESSURE INDICATOR DEVICE

Donald L. Campbell, Short Hills, N. J., assignor to Standard Oil Development Company, a corporation of Delaware Application December 28, 1943, Serial No. 516,746

4 Claims. (Cl. 62—1)

1

This invention relates to a method and apparatus for determining the difference between the total and partial pressures above volatile liquids when admixture may occur with a non-condensable gas. The invention relates more particularly to a control method and apparatus for determining the difference between the total and partial pressures above volatile liquids when admixture may occur with air in the course of a processing operation.

It is very desirable to have available as a constituent part of processing equipment a simple and readily responsive means for indicating pressure differentials due to contamination by extraneous gases during processing. In refrigeration systems, undue contamination of the refrigerants by air must be avoided. The presence of air in small quantities, for example, in ammonia compression refrigeration systems, causes disadvantages which are usually overcome by venting a mixture of air and ammonia at a point in the system at which the concentration of the admixed impurities is relatively high. The present invention is concerned with means which may be made automatic for quantitatively indicating the presence of non-condensable gases in admixture with the vapors of highly volatile liquids; and also for controlling the venting of the non-condensable gas such as air from such systems.

The basis of the invention is to have the pressure effects of the pure saturated vapor of the highly volatile liquid and that of the saturated vapor of the highly volatile liquid contaminated with a non-condensable gas in opposition or counter-balanced in a responsive medium which is in contact with an indicator system so that the combination of the responsive medium and the indicator system quantitatively absorbs and indicates the pressure differential.

Thus an embodiment of the invention is to have an indicator system responsive to the difference of two pressures, one being the vapor pressure of the relatively pure volatile liquid, and the other being the pressure of the saturated vapor of the volatile liquid plus the pressure of the contaminating gas. In an ammonia compression system, a bulb full of liquid ammonia and ammonia vapor may be submerged below the level of the liquid ammonia in the receiver following the condenser. The temperature of the liquid and vapor in the bulb will thus be at the same temperature as that of the liquid in the receiver. The bulb is connected to one side of the differential pressure device. The other side of the differential pressure device is connect-

2 ed so to be responsive to the pressure above the liquid ammonia in the receiver. In the differential pressure device there will thus be an unbalance of pressures if the ammonia vapor above the liquid in the receiver is contaminated by air. The unbalance of pressures in the device will be opposed by a spring or other means so that the position of the differential pressure indicator system will be a measure of the amount of contaminating air mixed with the saturated ammonia vapor in the receiver.

The utility of the device of this invention may be further extended by having the indicator system connected to a valve in a process line of the refrigeration system so that at a suitable location, a mixture of air and ammonia may be vented from the vapor space above the liquid so as to reduce the air content.

In order to provide a more complete understanding of the invention, an embodiment of the invention is illustrated in the accompanying drawing and is described in the following paragraphs.

Diagrammatically illustrated in the drawing is a differential pressure diaphragm control valve 1 located in the air vent line 2 from an ammonia storage drum 3 of a compression ammonia refrigeration system. Liquid ammonia, vapor ammonia and air from the compressors enter said drum through line 7 and liquid ammonia leaves the drum through line 8. One side of the control valve is connected to a bulb 4 containing liquid and saturated ammonia vapor maintained below the level of the liquid in the storage vessel, while the other side is connected to the vapor space above the liquid level in the same tank. Opposing the movement of the flexible member 5 in the control valve on the relatively pure ammonia side is a spring 6. It will be seen, therefore, that the position of the diaphragm is dependent upon the differential pressure due to the presence of the air, and the opposing spring pressure. The position of the diaphragm may be used to control the amount of valve opening in a venting system. The combination of this equipment can thus be made to function to control air contamination in a refrigeration system.

In one system, as a particular illustration, when air had leaked into the ammonia system to cause a pressure differential of approximately two pounds per square inch, a differential pressure controller on the air outlet of the venting system was made to commence to open. At a differential pressure of 6.5 lbs. per square inch, the controller was made to hold the venting system completely open. As additional equipment in this case in order to minimize loss of ammonia upon venting, means were provided to cool the mixture of air and ammonia and effect collection of condensed ammonia previous to venting.

The invention now having been described and suitably illustrated, what is claimed is:

1. An apparatus for automatically controlling the venting of a mixture of vapors of a highly volatile liquid and a non-condensible gas which comprises a storage zone, means for introducing the mixture into the storage zone and means for drawing liquid from the bottom of said storage zone, means for venting vapors from said storage zone through a flexible diaphragm controlled valve, means for transmitting the vapors from the vapor area of said storage zone to one side of said flexible diaphragm, means for storing a separate body of high volatile liquid immersed in the main body of liquid in said storage zone and means for transmitting the vapors from said separate body of liquid to the other side of said diaphragm, whereby the position of said valve is controlled.

2. In the art of operating an ammonia refrigeration system wherein leakage of air into the system occurs and wherein the air is vented from a zone in the system through a valve operated by means of the relative position of a flexible diaphragm, the method of controlling the relative position of said flexible diaphragm which comprises passing liquid ammonia containing the air into said zone under such conditions that said zone contains a vapor area comprising ammonia and air and an area comprising liquid ammonia, withdrawing liquid ammonia from said zone, maintaining a vapor leg comprising ammonia and air between said vapor area and one side of said flexible diaphragm, maintaining a second vapor leg comprising ammonia and air between said vapor area and said valve, maintaining a separate body of liquid ammonia immersed in said liquid area in said zone, maintaining a pure ammonia vapor leg between said separate body of liquid ammonia and the other side of said flexible diaphragm member, whereby the position of said flexible diaphragm member will change as the relative vapor pressures of the respective vapor legs change and whereby said valve will be operated, thus periodically venting said vapor area in said zone and whereby the amount of air in said ammonia compression refrigeration system is reduced.

3. In the art of operating an ammonia compression refrigeration system wherein leakage of air into the system occurs, the improved method of automatically venting air from the system which comprises passing liquid ammonia containing the air into a storage zone under such conditions that said storage zone contains a vapor area comprising ammonia and air and an area comprising liquid ammonia, withdrawing liquid ammonia from said liquid area, maintaining an initial vapor leg comprising ammonia and air in open communication with said vapor area, maintaining a second vapor leg comprising ammonia and air in open communication with said vapor area, maintaining a separate body of liquid ammonia immersed in the liquid ammonia in said liquid area in said storage zone, maintaining a pure ammonia vapor leg in open communication with said separate body of liquid ammonia, balancing the pressure exerted by said initial vapor leg comprising ammonia and air in open communication with said vapor space against the pressure exerted by said vapor leg in open communication with said separate body of liquid ammonia and employing the relative difference in the respective pressures to vent said second vapor leg to the air, whereby the amount of air in said ammonia compression refrigeration system is reduced.

4. In the art of operating an ammonia compression refrigeration system wherein leakage of air into the system occurs, the improved method of automatically venting air from the system which comprises passing liquid ammonia containing the air into a storage zone under such conditions that said storage zone contains a vapor area comprising ammonia and air and an area comprising liquid ammonia, withdrawing liquid ammonia from said liquid area, maintaining a vapor leg comprising ammonia and air between said vapor area and one side of a flexible diaphragm member, maintaining a second vapor leg comprising ammonia and air between said vapor area and a vent valve which is characterized in that it is adapted to be operated by the fluctuations of said flexible diaphragm member, maintaining a separate body of liquid ammonia immersed in the liquid ammonia in said liquid area in said storage zone, maintaining a pure ammonia vapor leg between the separate body of liquid ammonia and the other side of said flexible diaphragm member, whereby the position of said flexible diaphragm member will change as the relative vapor pressures of the respective vapor legs change and whereby said vent valve on said second vapor leg will open or close, thus periodically venting said vapor area in said storage zone and whereby the amount of air in said ammonia compression refrigeration system is reduced.

DONALD L. CAMPBELL.

REFERENCES CITED

The following references are of record in the file of this patent:

UNITED STATES PATENTS

| Number | Name | Date |
| --- | --- | --- |
| 1,248,698 | Murray | Dec. 4, 1917 |
| 1,393,942 | Chadwell | Oct. 18, 1921 |
| 1,636,512 | Kilger | July 19, 1927 |
| 1,661,995 | Brown | Mar. 6, 1928 |
| 1,917,810 | Reynoldson | July 11, 1933 |
| 1,919,346 | Smith | July 25, 1933 |
| 2,119,786 | Kallam | June 7, 1938 |
| 2,126,052 | Smith | Aug. 9, 1938 |
| 2,152,979 | Schwander | Apr. 4, 1939 |
| 2,266,955 | Borden | Dec. 23, 1941 |
| 2,281,978 | Kibre | May 5, 1942 |

FOREIGN PATENTS

| Number | Country | Date |
| --- | --- | --- |
| 192,483 | Great Britain | Feb. 2, 1923 |